Nov. 13, 1962 J. W. ALLEN 3,063,675
TURNTABLE TYPE LIFT CONVEYOR
Filed May 3, 1960 2 Sheets-Sheet 1
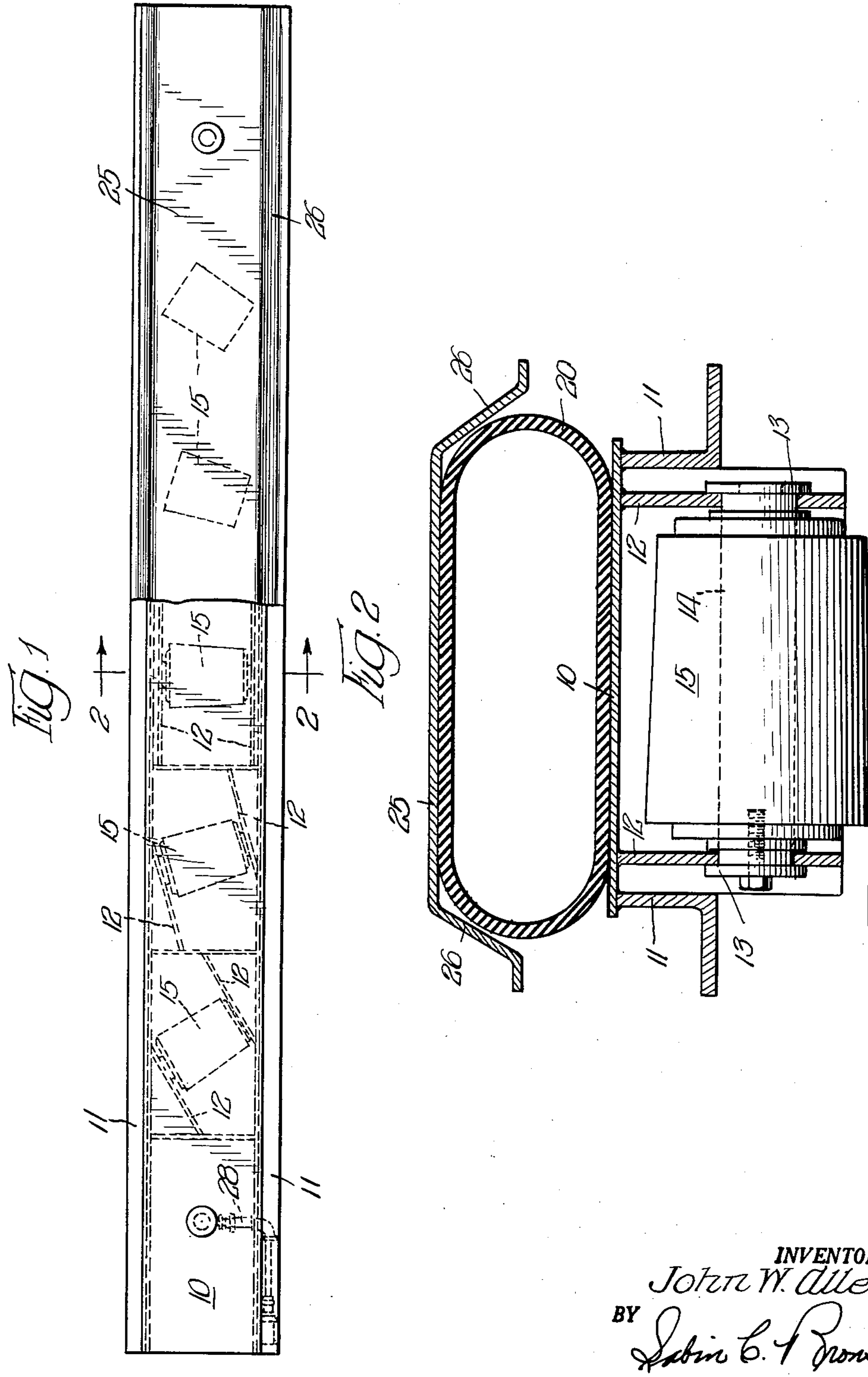
INVENTOR.
John W. Allen,
BY Sabin C. Bronson.
Atty Nov. 13, 1962 J. W. ALLEN 3,063,675

TURNTABLE TYPE LIFT CONVEYOR

Filed May 3, 1960 2 Sheets-Sheet 2

INVENTOR.
John W. Allen,
BY Sabin C. Bronson.
Atty.

United States Patent Office 3,063,675 Patented Nov. 13, 1962

3,063,675

TURNTABLE TYPE LIFT CONVEYOR

John W. Allen, Hinsdale, Ill., assignor to Stanray Corporation, Chicago, Ill., a corporation of Delaware Filed May 3, 1960, Ser. No. 26,467
2 Claims. (Cl. 254—2)

This invention relates to lift conveyors and particularly to pneumatic lift conveyors for lifting and moving heavy objects.

In railroad freight service there is being offered compartmentalized shipping facilities adapted to handle shipments corresponding to a fractional part of a railroad boxcar load. In one form of compartmentalized shipping, the facility is a shipping container which is carried secured in place in the boxcar. The bottom surface of these shipping containers is usually provided with indents for convenience in applying the forks of lift trucks therein for raising the containers and then moving the containers wherever desired. In many locations lift trucks are unavailable and thus some means insertable in said indents for elevating the containers and easily moving same about are desired. Also means for elevating and moving the containers in an arcuate path is desirable.

For example, a long container may be loaded onto a railway flat car transversely thereof, and then turned, by the use of this invention, into its proper longtiudinal position on the car.

It is the principal object of the invention to provide an improved mobile lift conveyor supported on a plurality of tapered rollers mounted in the device, the axes of said rollers intersecting at a common point, which point is midway between two lift conveyer locations under the container, whereby the lift may be used as a turntable.

Additional objects and advantages of the invention pertain to the particular structure and arrangements thereof and will appear in the following description thereof.

Referring now to the accompanying drawing forming part of this application and wherein like reference characters indicate like parts:

FIG. 1 is a top plan view of a lift conveyor showing the rollers thereof in dotted lines.

FIG. 2 is a slightly enlarged cross sectional view taken on the line 2—2 of FIG. 1.

Figure 3:
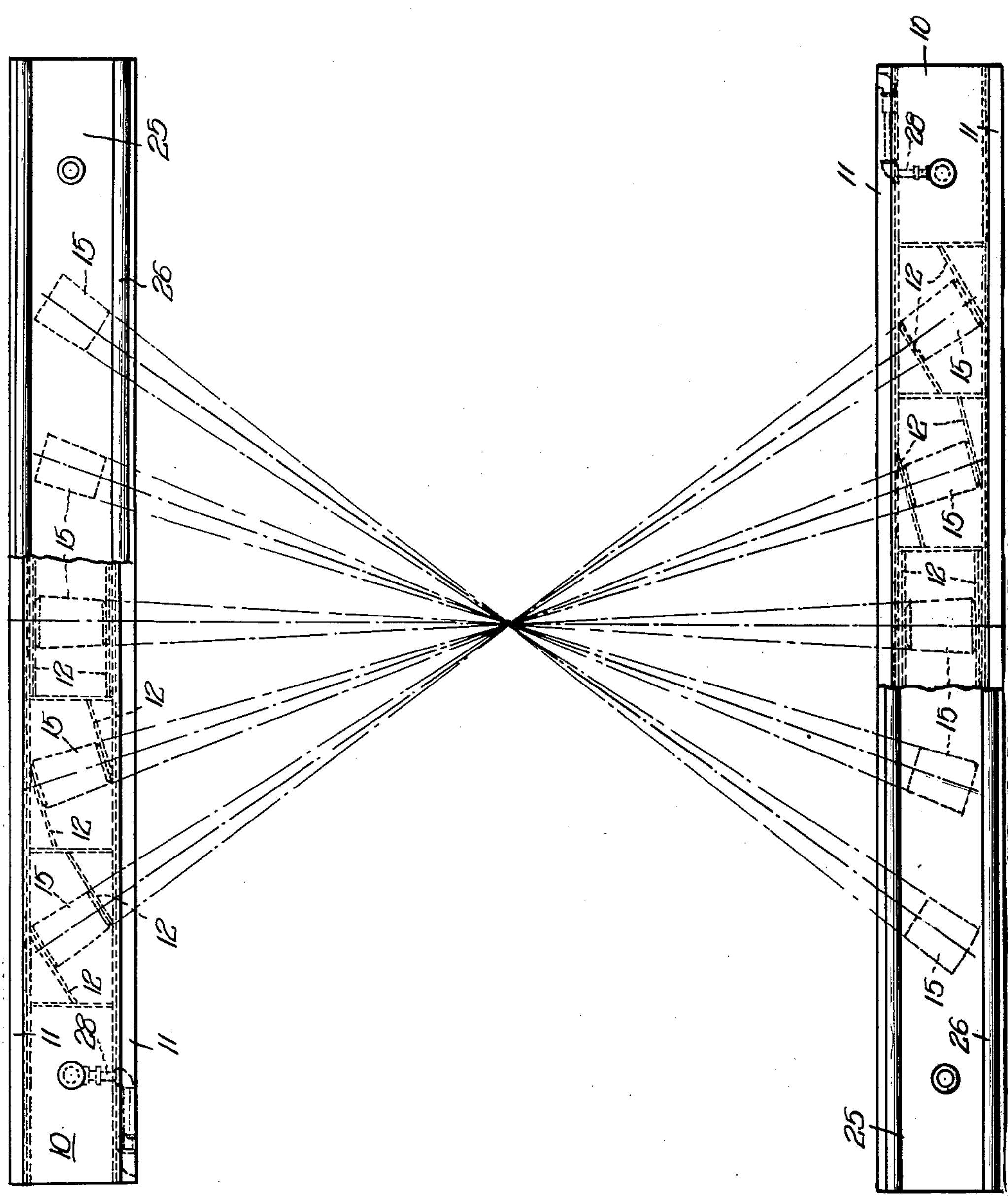
FIG. 3 is a plan view of a pair of the lift conveyors illustrating how they function as a turntable.

In the drawings there is shown an inverted base channel member comprising an elongated base plate member 10 having a pair of angle members 11—11 secured along the edge of one flange of each angle member to the side edge of the plate member 10 as shown in FIGURE 2, thus forming the base channel member. Spaced inwardly a short distance from the angle members 11 are secured along one edge thereof to the plate member 10 a pair of plates 12—12, which depends normally from the plate 10, there being a pair of said plates 12—12 for each roller. The plates 12 of each pair are parallel to each other, and support the ends 13 of an axle 14 upon which a tapered roller 15 is mounted. Each pair of plates 12, except the centermost pair, is arranged at an angle to the longitudinal so that the axle of the roller supported thereby is normal to the plates, and the axes of all rollers intersect at a common point. Furthermore the radii of some of the rollers are of different lengths. When the device is moved, therefore, the rollers must always roll about in concentric circles having a common center, which is also the point of intersection of the axes of the rollers. Being tapered, the rollers will roll in a circular path without slippage, since the tapered surfaces of the rollers also intersect at the same point as that of the axes.

The drawing illustrates in FIGURE 3 a pair of lift conveyors, for application within the indents in the bottom surface of containers moved by the conveyors, or in indents in the floor of the car, and that the point of intersection the axes of the rollers is midway between the pair of conveyors, so that the two lift conveyors operate as a turntable.

The inflatable bag 20 is carried on the top of plate 10 and is preferably of a heavy cloth material coated with a sealer such as neoprene. A cover plate or channel member 25 is provided, having diverging side flanges 26—26, which channel member is supported upon the inflatable bag and overlies the base channel plate 10. In its inflated position as shown in FIGURE 2 the bag is extended in a perpendicular direction. In the deflated position of the bag the cover channel member is supported on the base member 10 by means of the collapsed side walls of the bag 20. The cross section of the bag is substantially rectangular, so as the bag is inflated pressures are built up within the bag which are exerted against the channel 25 and base member 10 to cause the channel 25 to rise perpendicularly and extend itself from the member 10. Means 28 is provided, having connection with the interior of the bag for attaching thereto a compressed air line to inflate the bag. The means 28 includes a two-way valve so that the bag may be inflated or deflated thereby. If the device is used in indents in the bottom of containers, it may not be necessary to provide the cover plate 25, in which case when the bag is inflated it would bear directly against the container and elevate same.

It may be desirable to glue the bag 20 to the cover plate member 25, and to the base plate member 10 along the opposite longitudinal center lines of said members, so as to position the bag correctly relative thereto. If the members are correctly positioned relative to each other, the air pressure can only cause relative vertical movement of said members.

While the embodiments described herein are at present considered to be preferred, it is appreciated that variations and modifications may be made therein. Accordingly, it is intended to cover in the appended claims all such modifications and variations as fall within the true spirit and scope of the invention.

I claim:

1. A lift conveyor for lifting and moving heavy objects in a circular path, comprising a narrow elongated channel member, a plurality of tapered rollers carried laterally within said channel member spaced apart one from another and extending therefrom for facilitating relative movement between said channel member and other bodies, the rollers being positioned within said channel member and oriented therein so that the longitudinal axes of said rollers intersect at a common point, said taper of said rollers being such that the vertex of the projected line segments of the tapered surfaces also lie at the common point of intersection of the longitudinal axes of the rollers, a cover plate member at the outer surface of said channel member, an inflatable container carried between the outer surface of said channel member and said plate member and coextensive therewith, and means for inflating said container, whereby responsive to the inflation of said container forces are exerted between said channel member and said plate member for causing extending movement therebetween.

2. A plurality of lift conveyors for lifting and moving heavy objects in a circular path, comprising a narrow elongated base channel member for each conveyor, a plurality of spaced apart tapered rollers carried within each base channel member, said rollers being oriented within said channel members so that the longitudinal axis of each of said rollers intersect at a common point, which common point also includes the vertexes of the extended line segments forming the tapered surfaces of each of the rollers, the channel members being adapted to be positioned relative to each other beneath said heavy objects so that there is one central common point of intersection for the axes of the rollers of all lift conveyors whereby said plurality of lift conveyors are effective to rotate as a turntable about this one central common point, an expandable flexible container carried upon each base channel member, and means for expanding the container, whereby responsive to expansion of the container lifting forces are exerted between the object to be moved and the rollers for causing extending movement therebetween.

References Cited in the file of this patent

UNITED STATES PATENTS

| | | |
|---|---|---|
| 244,703 | White et al. | July 19, 1881 |
| 376,972 | Towler | Jan. 24, 1888 |
| 1,005,495 | Zering | Oct. 10, 1911 |
| 2,828,027 | Stevenson et al. | Mar. 25, 1958 |
| 3,010,698 | Allen et al. | Nov. 28, 1961 |

FOREIGN PATENTS

| | | |
|---|---|---|
| 1,164,025 | France | May 5, 1958 |